(12) United States Patent
Sudhakar et al.

(10) Patent No.: US 9,720,840 B2
(45) Date of Patent: Aug. 1, 2017

(54) WAY LOOKAHEAD

(71) Applicant: Imagination Technologies, LLC, Santa Clara, CA (US)

(72) Inventors: Ranganathan Sudhakar, Santa Clara, CA (US); Parthiv Pota, Cupertino, CA (US)

(73) Assignee: Imagination Technologies, LLC, Santa Clara, CA (US)

(*) Notice: Subject to any disclaimer, the term of this patent is extended or adjusted under 35 U.S.C. 154(b) by 126 days.

(21) Appl. No.: 13/781,319

(22) Filed: Feb. 28, 2013

(65) Prior Publication Data

US 2014/0244933 A1 Aug. 28, 2014

(51) Int. Cl.

| | |
|---|---|
| *G06F 12/08* | (2016.01) |
| *G06F 12/0864* | (2016.01) |
| *G06F 12/0855* | (2016.01) |
| *G06F 9/38* | (2006.01) |
| *G06F 3/06* | (2006.01) |
| *G06F 12/02* | (2006.01) |

(52) U.S. Cl.
CPC ........ *G06F 12/0864* (2013.01); *G06F 9/3802* (2013.01); *G06F 12/0855* (2013.01); *G06F 3/0625* (2013.01); *G06F 12/0215* (2013.01); *G06F 2212/1028* (2013.01); *G06F 2212/452* (2013.01); *Y02B 60/1225* (2013.01)

(58) Field of Classification Search
CPC ............ G06F 12/0864; G06F 12/0862; G06F 1/3275; G06F 9/3802; G06F 2212/1028; G06F 3/0625; G06F 12/0215; Y02B 60/1225
See application file for complete search history.

(56) References Cited

U.S. PATENT DOCUMENTS 6,073,230 A * 6/2000 Pickett et al. ................ 712/205
2012/0173821 A1* 7/2012 Levenstein et al. .......... 711/125

* cited by examiner

*Primary Examiner* — David X Yi
*Assistant Examiner* — Alan Otto
(74) *Attorney, Agent, or Firm* — Vorys, Sater, Seymour and Pease LLP; Vincent M DeLuca

(57) ABSTRACT

Methods and systems that identify and power up ways for future instructions are provided. A processor includes an n-way set associative cache and an instruction fetch unit. The n-way set associative cache is configured to store instructions. The instruction fetch unit is in communication with the n-way set associative cache and is configured to power up a first way, where a first indication is associated with an instruction and indicates the way where a future instruction is located and where the future instruction is two or more instructions ahead of the current instruction.

17 Claims, 4 Drawing Sheets

Current Systems

Current Systems

WAY LOOKAHEAD

BACKGROUND

Field of the Invention

The invention is generally related to systems and methods for reducing processor power consumption during the instruction fetch stage of processing. More specifically the disclosure is related to predicting the location of instructions within the instruction cache.

Related Art

Processor designers are continually attempting to improve the performance of processors. Performance can be measured in many different ways. For example, processor designers strive to reduce the power used by the processor. This can be done by turning off parts of the processor that are not currently handling tasks. For example, processor designers have broken up the area of memory that stores instructions, known as the instruction cache, into multiple pieces or ways, such as a 2 ways, 4 ways, etc. This allows the processor designer to power down ways that do not contain instructions that are currently being fetched.

In another example, processor designers may increase the speed of the processors, either in terms of the clock speed at which the processor runs at or the number of instructions the processor can complete in a given time period, e.g., in one second. In order to increase the speed that processors can execute instructions, processor designers have broken down the steps of executing instructions into discrete stages called pipelines. This allows designers to design processors that can execute multiple instructions in parallel, one for each stage. For example, the processor can be broken down into 5 pipeline stages, Instruction Fetch, instruction Decode, Execution, Memory Access, and Register Write Back. During execution, this allows a processor to fetch an instruction, while the previous instruction is being decoded, the instruction before that is being executed, the instruction before that is accessing memory, and the instruction before that is writing its results back into the register file. FIG. 1 illustrates this performance increase. FIG. 1A illustrates how a processor without any pipelined execution would process three instructions. In FIG. 1A, each of the instructions takes 5 time units to execute. Since there is no pipelining, each instruction cannot begin until the previous instruction finishes. Therefore, it takes 15 time units to complete these three instructions.

In FIG. 1B, the same three instruction are illustrated being executed on a pipelined processor. Because each instruction can begin a given stage as soon as the previous instruction is finished with that stage, the processor is able to process these three instructions in seven time units.

In more complex processor architectures these stages can further be broken down. For example the Instruction Fetch stage can be broken down into Instruction Prefetch (IP), Instruction Tag Read (IT), Instruction Predict (ID), and Instruction Select (IS). During the IP stage, the processor can determine the address of the next instruction to be fetched. During the IT stage, the processor can read the tags and data from the cache at the address. During the ID stage, the processor can figure out the way where the next instruction will be located, for example by reading the tags.

As the clock cycle decreases, the number of pipeline stages must increase to accomplish the required task. For example, if it took 40 ns to complete the instruction fetch stage, but the clock cycle needs to be decreased to 10 ns, the instruction fetch stage may be able to be broken down as described above. Unfortunately, this has the consequence of requiring sacrifices in other areas of performance. For example, there is not enough time to predict in which way the next instruction will be located before it is needed. Therefore, power savings that were introduced by partitioning the instruction cache into 2, 4, or more ways are now lost.

BRIEF SUMMARY OF THE INVENTION

What is needed, therefore, are systems and methods that allow the processor's instruction fetch stage to execute as fast as possible in a pipelined manner while also predicting the way for future instructions early enough to limit the number of ways that need to be powered. According to embodiments of the invention, a method is provided that calculates an instruction pointer for a first instruction, reads a first tag for the instruction pointer, determines the way where a future instruction is located, and powers up that way. The future instruction is an instruction that will execute two or more cycles after the first instruction, and the way will be powered up at an appropriate time for this future instruction.

Embodiments of the invention include a processor. The processor includes an n-way set associative cache and an instruction fetch unit. The n-way set associative cache is configured to store instructions. The instruction fetch unit is in communication with the n-way set associative cache and is configured to power up a first way, where a first indication is associated with an instruction and indicates the way where a future instruction is located and where the future instruction is two or more instructions ahead of the current instruction.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1A:
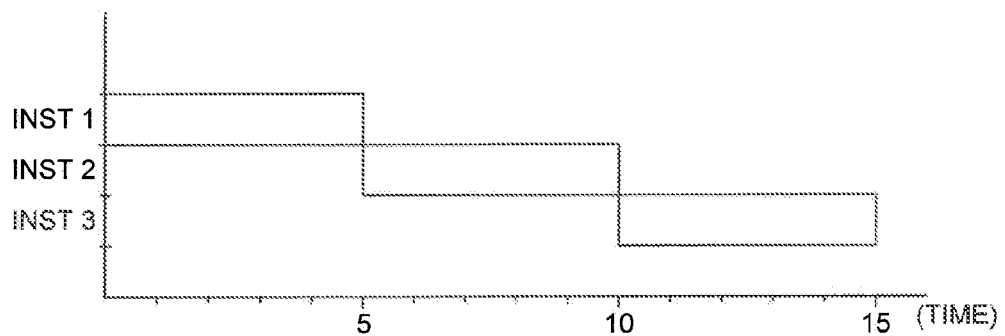
FIGS. 1A and 1B depict a timing diagram showing the processing of three instructions in a non-pipelined and pipelined manner, respectfully.

Features and advantages of the invention will become more apparent from the detailed description of embodiments of the invention set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION

The following detailed description of embodiments of the invention refers to the accompanying drawings that illustrate exemplary embodiments. Embodiments described herein relate to a low power multiprocessor. Other embodiments are possible, and modifications can be made to the embodiments within the spirit and scope of this description. Therefore, the detailed description is not meant to limit the embodiments described below.

It should be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

Figure 1B:
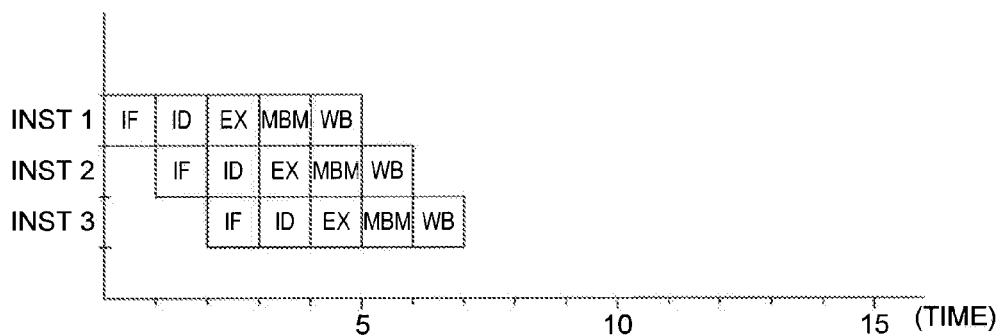
Figure 2:
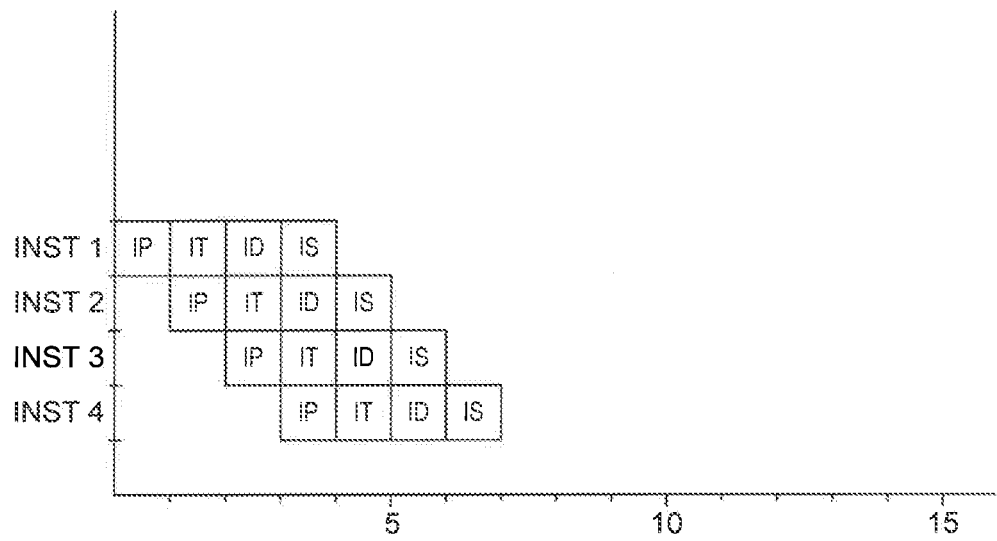
FIG. 2 depicts a timing diagram of processing four instructions through the instruction fetch stage of a processor, according to various embodiments of the invention.

FIG. 1A depicts instruction execution in a processor without pipelining, as previously described. FIG. 1B illustrates the improvement by the use of pipelining, as discussed above. FIG. 2 illustrates a more complex pipelined architecture, where the instruction fetch phase has been broken down into 4 sub-stages. The instruction cache is powered up and any tags associated with the instruction are read in the IT phase. For example, the instruction may include a tag indicating where the next instruction is located. In the ID stage the processor can process any information in the tags, for example the way where the next instruction is located. Because the ID stage is executed in parallel with the IT stage of the next instruction, the processor is not yet able to inform the IT stage about which way to power up. Therefore, the processor has to make a choice. If power conservation is more important than speed, the processor can stall the following instruction until the way prediction is ready, and then resume execution. If speed is more important, the processor can power up all ways, read information from all of them, and then determine which ways will be utilized.

In an embodiment, instructions can be associated with additional information. This information can be stored in a second cache, as a prefix to the instruction, or in other methods known to a person skilled in the art. This additional information informs the processor of the way where the instruction two instructions ahead of the current instructions is located. For example, in FIG. 2, INST 1 can be associated with information about the way where INST 3 is located. Thus at the end of INST 1's ID phase, the ID phase can inform the IT stage of the way where INST 3 is located.

Figure 3:
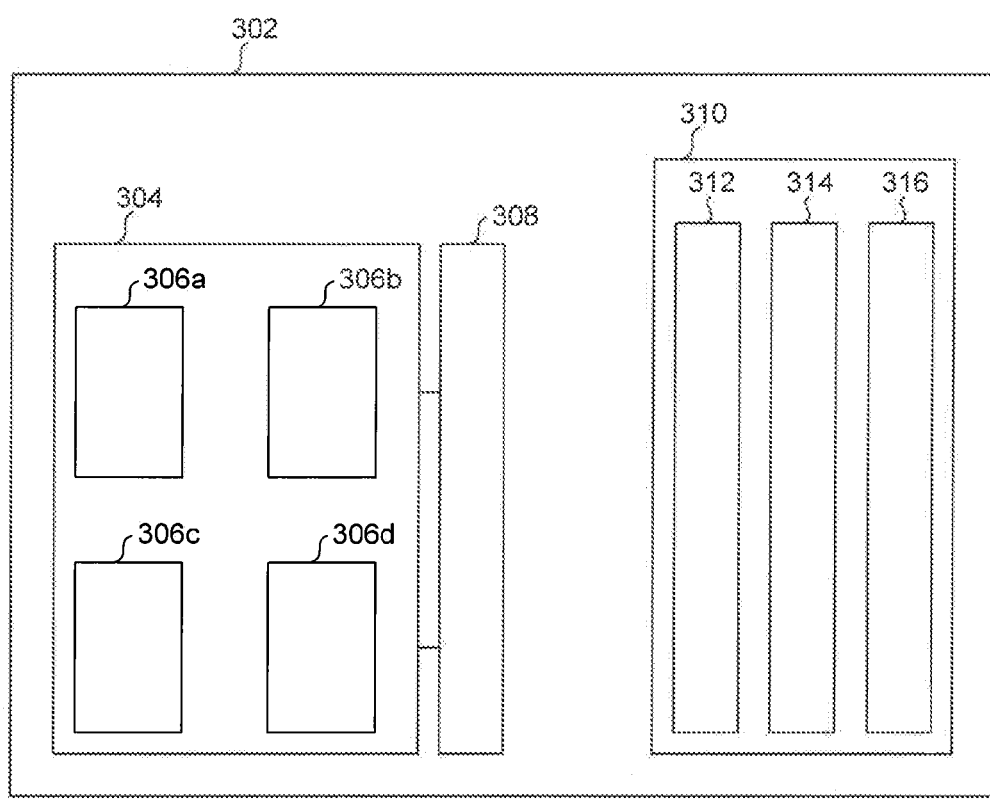
FIG. 3 depicts an instruction fetch unit according to various embodiments of the invention.

FIG. 3 illustrates the instruction fetch unit system 300 of an embodiment. System 300 consists of instruction fetch unit 302 that includes an instruction cache 304, a way lookahead buffer 308, and a branch target buffer (BTB) 310.

Instruction cache 304 can be broken down into multiple ways, for example four ways 306a-d illustrated in FIG. 3. Each way stores a portion of the instructions in the instruction cache. For example, each way 306a-d can store a quarter of the instructions in instruction cache 304.

In an embodiment, the location of a future instruction, e.g., the way where the future instruction is located, is also stored. In an embodiment the location of the future instruction is stored in way lookahead buffer 308. In another embodiment it may be stored with the instructions, for example as a prefix to each instruction. Other arrangements are possible, as a person skilled in the art would realize.

In an embodiment, the way information stored would indicate the way of an instruction two or more instructions ahead, depending on the architecture. In an example, as described above, and illustrated in FIG. 2, the instruction fetch unit is broken down into four stages, where the third stage identifies the predicted way, but the second stage needs that information. In this example, the processor can associate the way information for the instruction two instructions with the current instruction, e.g., instruction 1 can store the way location for instruction 3, instruction 2 can store the way location for instruction 4, etc. Thus, looking at FIG. 2, INST 1 will provide a prediction for INST 3, INST 2 will provide a prediction for INST 4, etc. Thus, after the first two instructions, the processor will always be informed about the correct way to power up before the IT stage needs to read the information from the ways. Persons skilled in the art would understand that other configurations are possible, and that changes in how the instruction fetch unit is staged would affect in which instruction the way information is stored. For example, if there was an extra stage between the IT and ID stages in FIG. 3, the current instruction could be associated with the way information about the instruction three instructions ahead of it, rather than two.

Branching

For simplicity sake, the above description has assumed that the instructions are executed in a sequential manner, e.g., INST 1 is always followed by INST 2 which is always followed by INST 3, and so on. In an embodiment, the branch target buffer (BTB), e.g., BTB 310, is modified to predict the ways for instructions after a branch instruction.

A branch instruction moves operation from one section of code to another. Branching instructions are often conditional, based on the results of previous instructions. If the branch is not taken, then sequential execution of instructions continue. If the branch is taken, execution jumps to a new area of code based on the branching instruction.

In an embodiment, the BTB has been modified to help account for branching instructions. BTB's are used to predict the result of a branching instruction. For example, if a portion of code is supposed to be executed a number of times, e.g., a loop, after one or more cycles, the BTB may predict that instruction execution will continue from the start of the loop when the last instruction of the loop is reached. Using this mechanism, way prediction can also be included.

In an embodiment, the BTB, for example BTB 310 shown in FIG. 3, may include a next instruction pointer cache 312 and a target way lookahead cache 314. Next instruction pointer 312 stores the instruction pointer for the instruction if the branch is taken. It can also store a prediction of whether or not the branch will be taken. Target way lookahead cache 314 contains information about the way where the instruction identifies in next instruction pointer cache 312 is stored. Thus, when the processor encounters a branch instruction, it can look at next instruction pointer cache 312 to determine if the branch is going to be taken. If the branch is not taken, the processor can find the information in way lookahead buffer 308 associated with this instruction and inform the IT stage what way to power up for the instructions after the branch. If the branch is taken, the processor can find information in target way lookahead cache 314 within BTB 310 associated with this instruction and inform the IT stage what way to power up for the instruction after the branch at the new location.

In another embodiment, the BTB, for example BTB 310 shown in FIG. 3, may include a next-to-target way lookahead cache 316. As discussed above, due to the pipelined nature of computer processing, the next way is not available in time to allow the processor to determine which way to power up. Above we have discussed how to correct for this issue by providing an indication of the way two or more instructions ahead. In order to keep instructions executing in an efficient manner, both in terms of speed and power usage, next-to-target way lookahead cache 316 provides the way information for instructions that are two or more instructions ahead of the target of a branch instruction. This allows the processor to power up the correct ways for the instructions after the branch is taken. For example, looking at the sample set of instructions below in Table 1:

TABLE 1

Sample Branch Instruction Sequence with Lookahead Buffers

| Inst. Pointer | Way | Action | Way Lookahead Buffer | Target Way Lookahead | Next-to-Target Way Lookahead |
|---|---|---|---|---|---|
| 0 | 3 | Add A, B, C | 1 | x | x |
| 1 | 2 | Mul A, B, C | 3 | x | x |
| 2 | 1 | Sub A, A, A | 0 | x | x |
| 3 | 3 | Jmpz 0 | 1 | 3 | 2 |
| 4 | 0 | Div A, B, C | x | x | x |
| 5 | 1 | cmp B, C | x | x | x |

The Inst. Pointer column provides a sample instruction pointer. The Way column provides the way where this instruction is located. The Action column provides the instruction being executed. Jmpz 0 is a sample conditional jump instruction that will jump to instruction pointer 0 if the result of the previous instruction is zero. The Way Lookahead Buffer is a sample way lookahead buffer 308, described above. It contains the way of the instruction two ahead of the current instruction. For example, for the instruction at instruction pointer 0, the Way Lookahead Buffer contains 1, the way where the instruction at instruction pointer 2 is located. The Target Way Lookahead is a sample target way lookahead cache 314, described above. The Target Way Lookahead will only have information for branching instructions. In this case, it contains the way information for the instruction at instruction pointer 0. The Next-to-Target Way Lookahead is a sample next-to-target way lookahead cache 316, described above. The Next-to-Target Way Lookahead will also only have information for branching instructions. In this case, it contains the way information for the instruction at instruction pointer 1, e.g., the instruction after the instruction that the branch points to.

In the above example, when the "sub" instruction, subtracting the current value in A from the current value in A and storing the result in A, is executed, the result will always be zero. Therefore, the "jmpz" instruction will always choose to take the branch, and the branch prediction will always predict to take the branch. When the "jmpz" instruction is reached, the processor has to make a choice to either power up way 0 for the instruction at instruction pointer 4, as indicated in the Way Lookahead Buffer for the previous instruction, or way 3 for the instruction at instruction pointer 0, as indicated in the Target Way Lookahead. Since the branch prediction will indicate that the branch will be taken, the processor will power up way 3.

If the processor does not have next-to-target way lookahead cache 316 it will need to take a one cycle performance hit or power up all of the ways, when fetching the instruction at instruction pointer 1. This is because prior to the branch instruction, the only information the processor had was regarding the instruction execution assuming the branch was not taken, e.g., sequential instruction execution. In terms of the instruction fetch stages discussed above, when the processor reaches the IT stage of the instruction at instruction pointer 1, the processor will have completed the ID stage of the branch instruction and will not have started the ID stage for the instruction at instruction pointer 0. The next-to-target way lookahead cache 316 allows the processor to maintain it throughput while not increasing power by providing information regarding the instruction after the branch target instruction, in this case the instruction at instruction pointer 1.

Figure 4:
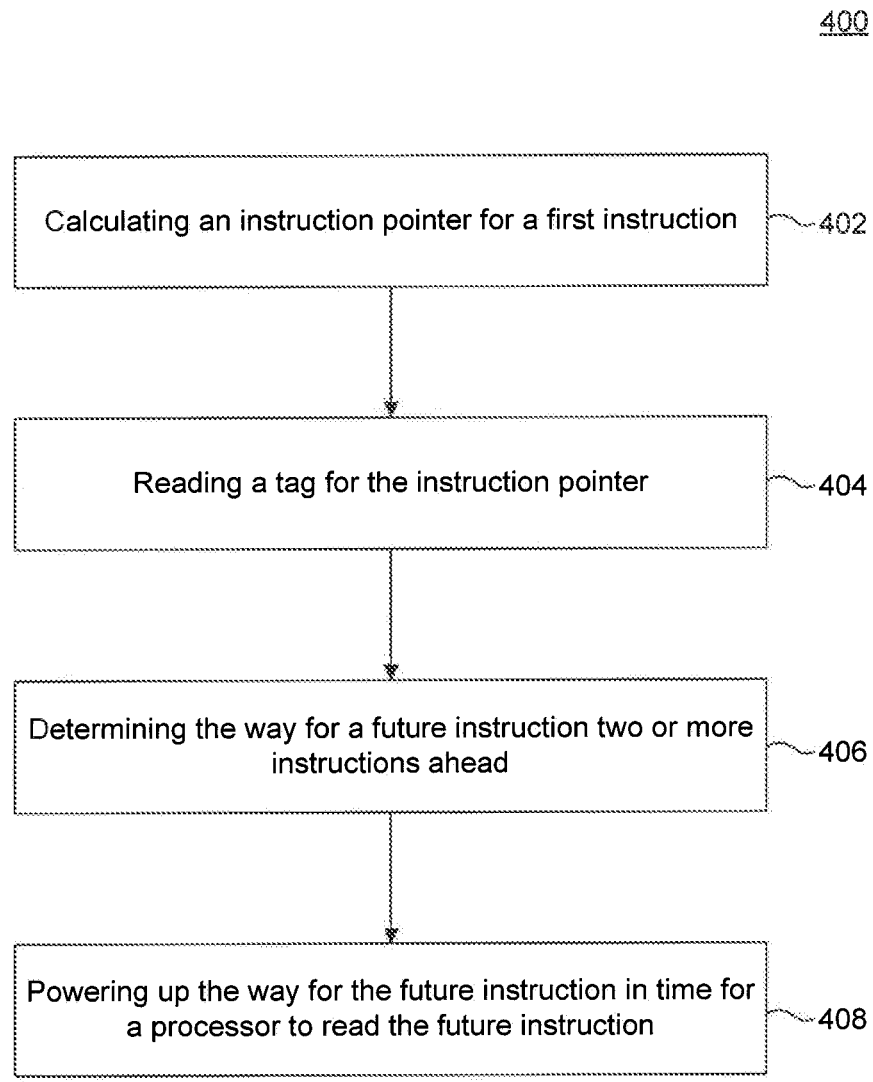
FIG. 4 illustrates a method of powering up a way for a future instruction according to various embodiments of the invention.

FIG. 4 illustrate a method 400 of managing the power used by the instruction fetch unit of an embodiment. At step 402, the instruction fetch unit can calculate an instruction pointer for a first instruction. This can be based on the previous instruction pointer, the length of the previous instructions, prefixes attached to the pervious instruction, predetermined length of instructions, or other information known to those skilled in the art.

At step 404, the instruction fetch unit reads a tag associated with the calculated instruction pointer. In an embodiment, the tag can be a prefix for the instruction. In another embodiment, the tag can be stored in a separate cache, for example way lookahead buffer 308, discussed above and illustrated in FIG. 3. The tag can also be stored in other locations, as would be understood by those skilled in the art. A second tag can also be read from a branch target buffer (BTB). As described above, the BTB stores information related to the destination of branching instructions. Based on the branch prediction, also stored in the BTB, the instruction fetch unit can make a prediction on which whether the branch is taken.

At step 406, the instruction fetch unit determines the way where a future instruction is located. The future instruction is two or more instructions ahead of the current instruction depending on the architecture of the instruction fetch unit, as described above. If this is a branch instruction, the way determination may also use the branch prediction to choose between the tag associated with the instruction pointer and the tag stored in the BTB.

At step 408, the instruction fetch unit powers up the way determined in step 406. The instruction fetch unit can time the powering up of the way to correspond with when the instruction fetch unit will need to fetch the future instruction from the way. If this instruction is a branch, the instruction fetch unit can also power up the ways for future instructions after the branch target instruction. As described above, this would allow the instruction fetch unit to continue executing instructions with the same efficiency.

While various embodiments have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (e.g., schematic) capture tools. Embodiments can be disposed in any known non-transitory computer usable medium including semiconductor, magnetic disk, optical disk (e.g., CD-ROM, DVD-ROM, etc.).

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence. It will be appreciated that embodiments using a combination of hardware and software may be implemented or facilitated by or in cooperation with hardware components enabling the functionality of the various software routines, modules, elements, or instructions, e.g., the components noted above with respect to FIG. 3.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An apparatus comprising: a processor; an associative cache configured to store a plurality of instructions in a plurality of selectively powered ways; and an instruction fetch unit configured to fetch, for execution by said processor, a current instruction from said associative cache in accordance with an instruction pointer; wherein said processor is configured to identify a way of said associative cache in which a future instruction that is a predetermined plurality of instructions ahead of said current fetched instruction is located, using way information for the future instruction that is associated with said current fetched instruction and retrieved together with said current fetched instruction, and said identified way of said associative cache is selectively powered at a time corresponding to when that said future instruction needs to be fetched by said instruction fetch unit.

2. The apparatus of claim 1, wherein:
the processor processes instructions in pipelined stages;
the information associated with the fetched instruction is a lookahead indicator;
the lookahead indicator is retrieved at a second stage of said pipeline; and
the way associated with the future instruction is identified using the lookahead indicator at a third stage of said pipeline.

3. The apparatus of claim 2, wherein the lookahead indicator is stored as a prefix to the first instruction.

4. The apparatus of claim 2, wherein the lookahead indicator is stored in a way lookahead buffer.

5. The apparatus of claim 1, further comprising a branch target buffer (BTB) configured to provide a branch indicator that indicates one or more ways of the plurality of ways where an instruction after a branch is located if the branch is taken.

6. The apparatus of claim 5, wherein the BTB further comprises a next-to-target indicator indicating where a way associated with a next-to-target instruction is located, and wherein the next-to-target indicator is used to power the way associated with the next-to-target instruction.

7. The apparatus of claim 6, wherein either the lookahead indicator or the next-to-target indicator is used to determine which of the plurality of ways to power based on a BTB prediction.

8. The apparatus of claim 6, wherein the next-to-target indicator further comprises ways for instructions after the next-to-target instruction.

9. The apparatus of claim 5, wherein the instruction fetch unit is further configured to use the BTB to power one or more of the plurality of ways.

10. The apparatus of claim 5, wherein the BTB is further configured to provide a prediction of a result if the branch is taken.

11. The apparatus of claim 5, wherein the BTB further comprises a next-to-target way lookahead cache configured to provide information for instructions that are two or more instructions ahead of the branch.

12. The apparatus of claim 1, wherein the associative cache is a 2-, 4-, or 8-way set associative cache.

13. The apparatus of claim 1, wherein the instructions are stored in the associative cache based on the lower byte of an instruction pointer.

14. A method comprising: fetching, in accordance with an instruction pointer, for execution by a processor, a current instruction from an associative cache configured to store a plurality of instructions in a plurality of selectively powered ways; identifying a way of said associative cache in which a future instruction that is a predetermined plurality of instructions ahead of said current fetched instruction is located, using way information for the future instruction that is associated with said current fetched instruction and retrieved together with said current fetched instruction, and selectively powering said identified way of said associative cache at a time corresponding to when that said future instruction needs to be fetched by said instruction fetch unit.

15. The method of claim 14, wherein said information is part of a branch target buffer (BTB) entry for said fetched instruction.

16. The method of claim 15, wherein said information associated with said fetched instruction comprises a branch tag based on a branch prediction from the BTB.

17. A non-transitory computer readable storage medium having encoded thereon computer readable program code for generating an apparatus comprising: a processor; an associative cache configured to store a plurality of instructions in a plurality of selectively powered ways; and an instruction fetch unit configured to fetch, for execution by said processor, a current instruction from said associative cache in accordance with an instruction pointer; wherein said processor is configured to identify a way of said associative cache in which a future instruction that is a predetermined plurality of instructions ahead of said current fetched instruction is located, using way information for the future instruction that is associated with said current fetched instruction and retrieved together with said current fetched instruction, and said identified way of said associative cache is selectively powered at a time corresponding to when that said future instruction needs to be fetched by said instruction fetch unit.

* * * * *